United States Patent [19]

Courtney

[11] Patent Number: 5,586,394
[45] Date of Patent: Dec. 24, 1996

[54] SELF-CONTAINED PLUMB BOB AND INK LINE MARKER WITH LINE CAPABLE OF AUTOMATIC BRAKING AND RETRACTION

[76] Inventor: Mick Courtney, 311 W. Main St., Enterprise, Oreg. 97828

[21] Appl. No.: 460,535

[22] Filed: Jun. 2, 1995

[51] Int. Cl.$^6$ .............................. G01C 15/10; B44D 3/38
[52] U.S. Cl. .................. 33/394; 33/413; 33/761
[58] Field of Search ........................ 33/413, 414, 393, 33/394, 391, 392, 34, 761

[56] References Cited

U.S. PATENT DOCUMENTS

| | | | |
|---|---|---|---|
| 932,218 | 8/1909 | Wilson | 33/393 |
| 1,357,270 | 11/1920 | Bush | 33/394 |
| 1,571,687 | 2/1926 | O'Loughlin | 33/394 |
| 1,876,473 | 9/1932 | Spaeth et al. | 33/393 |
| 2,492,609 | 12/1949 | Worden | 33/393 |
| 2,589,500 | 3/1952 | Landon et al. | 33/393 |
| 2,637,913 | 5/1953 | Williams | 33/393 |
| 3,011,263 | 9/1958 | Unger | 33/393 |
| 3,016,616 | 1/1962 | Matson | 33/393 |
| 3,064,356 | 11/1962 | Kruse | 33/394 |
| 4,459,761 | 7/1984 | Bosco | 33/414 |
| 4,697,349 | 10/1987 | Lee | 33/393 |
| 5,014,437 | 5/1991 | Sun | 33/761 |
| 5,469,633 | 11/1995 | St. Peter | 33/394 |

FOREIGN PATENT DOCUMENTS

| | | | |
|---|---|---|---|
| 0219480 | 6/1957 | Australia | 33/394 |
| 0136426 | 4/1985 | United Kingdom | 33/767 |

*Primary Examiner*—William A. Cuchlinski, Jr.
*Assistant Examiner*—Vagnola Khamvongsa

[57] ABSTRACT

A self contained plumb bob and ink line marker with a line capable of automatic braking and retracting, comprising a hollow housing wherein a line reel, in combination with an adjustable spring-loaded line retraction and braking mechanism, allows a flexible member to be manually extended from the reel by a tacking device for attachment of the apparatus to a reference point. The flexible member is coated with ink upon extension from the reel when the flexible member passes over an ink absorbent member enclosed inside the housing. The housing of the apparatus has a tapered point on one end and serves as a plumb bob weight for indicating verticals when the apparatus is suspended by the tacking device. For purposes of marking lines, the ink coated flexible member can be held taught between the tacking device and notches around the circumference of an aperture through which the flexible member exits the housing, pulled upwardly and quickly released to leave a clean, thin line on the adjacent surface.

4 Claims, 5 Drawing Sheets

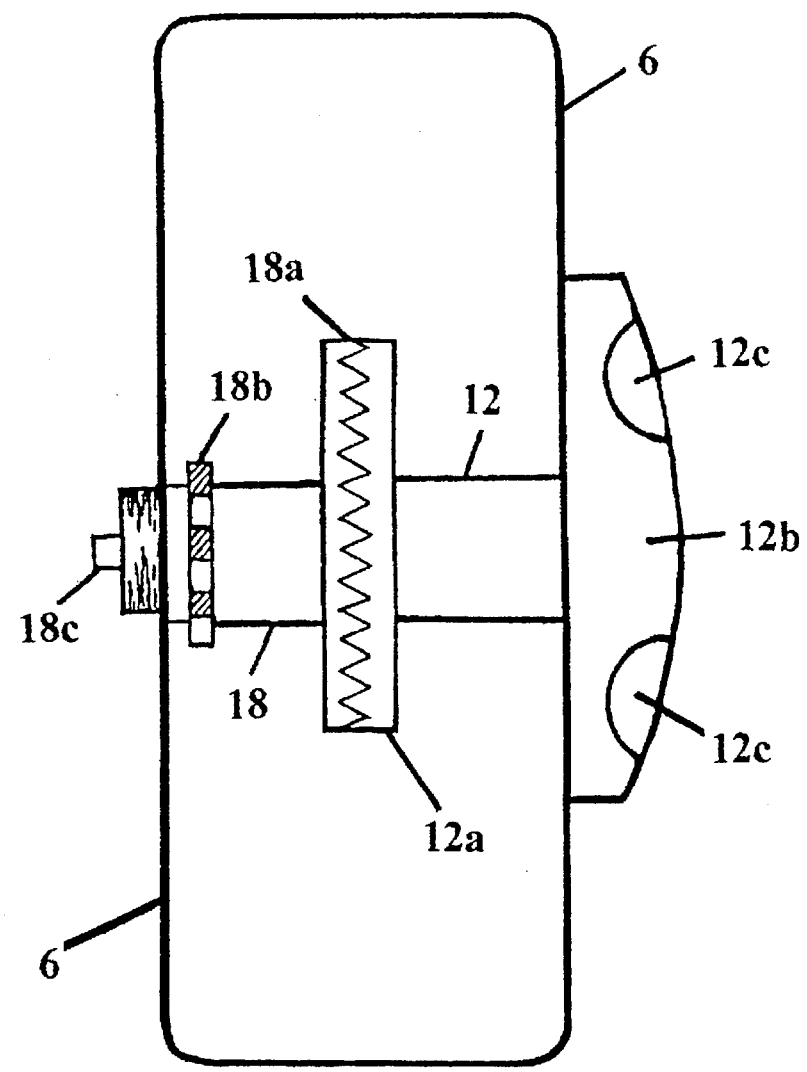

SELF-CONTAINED PLUMB BOB AND INK LINE MARKER WITH LINE CAPABLE OF AUTOMATIC BRAKING AND RETRACTION

FIELD OF THE INVENTION

The present invention relates to assemblies for a combination plumb bob and chalk or ink line marker, more particularly to such assemblies with a line capable of automatic braking and retraction.

BACKGROUND

Plumb bob devices acre commonly utilized in obtaining verticals for the proper erection ofstructures and in a variety of other contexts requiring accurate vertical placement.

Plumb bobs known in prior art generally entail the use of a string or other flexible member on Which there is suspended a weight with a downwardly tapered point on the lower end.

In use, the weight is suspended with the flexible member extended from an upper reference point. The weight oscillates until coming to rest such that the pointer on the weight indicates the vertical on a lower reference.

BACKGROUND: PRIOR ART

Plumb bob devices having a line capable of braking and retraction are well known in the prior art. The following U.S. patents are illustrative of the state of the art in the field of the invention:

Wilson, U.S. Pat. No. 932,218, Aug. 24, 1909 for a Reel. The line for a plumb bob is wound on a reel spool 18. A brake shoe is pressed against the periphery or head 20 of the spool by action of a spring 23. To release the brake alone, a trigger-like button 17 is pressed to compress the spring 23 further and release the brake shoe 18 from engagement with the head 20 permitting the line to be payed out or wound in.

Burns, U.S. Pat. No. 1,043,293, Nov. 5, 1912, for Plumb Bob. The bob line is wound upon a reel 7. A brake-ring 15 is actuated by a spring 20 to brake the reel 7. When pay out is desired, a button 21 is pressed to compress the spring and release the reel.

O'Loughlin, U.S. Pat. No. 1,571,687, Feb. 2, 1926, for Plumb Bob Carrier. A plumb carrier winds the cord of the plumb upon a reel mounted on a shaft 24 journaled in bearings. A spiral spring 25 within the reel causes winding of the cord when dogs 27 are in disengagement with cams 26, and when engaged halt the reel, as in windowshade operation.

Spaeth et al., U.S. Pat. No. 1,876,473, Sep. 6, 1932, for Plumb Bob and Chalk Line. A plumb bob contains a reel on which, by means of an external handle, the line is wound inside the bob to a desired length.

Holtz, U.S. Pat. No. 2,384,917, Sep. 18, 1945, for Plumb Bob Line ahd Reel. The reel container may be fastened to a wall. A set screw 20 may be applied against a flange 2a of the reel 2 in order to hold the line from payout.

Worden, U.S. Pat. No. 2,492,609, Dec. 27, 1949, for Brake for Plumb Bob Reels. A plumb bob 15 is reeled upon a reel 13. The handle 20 of the reel may fold inwardly for insertion in the open end of hub 10 of the reel to expand fingers 12 into tight fitting frictional engagement with the hub.

Landon et al., U.S. Pat. No. 2,589,500, Mar. 18, 1952, for Combined Chalk Line Box and Plumb Bob. A crank 27 width a handle 48 reels in pays out the line for a combined plumb bob and case. The crank handle 49 locks in an opening in the case when the device is not in use.

Williams, U.S. Pat. No. 2,637,913, May 12, 1953, for Plumb Bob Carrier. A slidable latch 41 engages the reduced neck 44 of a plumb bob in storage so that the bob is secured against or in a container for the line. The latch may be slid to release the neck and free the bob, allowing the line to be paid out.

Unger, U.S. Pat. No. 3,011,263, Dec. 5, 1962, for Plumb Bob Device. A reel or spool 3 is mounted rotably in a case 5 on a shaft 10. An operating crank 11 actuates the spool. Wells or sockets 12 in the case receive the handle 25 of the crank 11 for securing the reel or spool against rotation. There is no provision for distributing the line on the reel.

Matson, U.S. Pat. No. 3,016,606, Jan. 16, 1962, for Combination Marking Line and Plumb gob. A marking line 16 has one end fixed to the hub of a reel 3 enclosee on a container having a dye well for marking dye to be applied to the plumb line.

Bosco, U.S. Pat. No. 4,459,761, Jul. 17, 3984, for Retractable Plumb and Chalk Line. A crank arm at one end rotates a shaft 20 on which is wound the line of a plumb bob 12. A bell crank member 33 when retracted causes dog-engagement of lugs with the case to prevent unwinding of the line.

Plumb bob assemblies previously contemplated either do not include a means for braking and retracting the line or such means are cumbersome for requiring manual operation. In addition, those plumb bob assemblies in the prior art that do provide for a line capable of braking necessarily involve friction and excessive wear on the plumb bob line, a brake shoe-type device and/or spool head.

Prior art assemblies for a combination plumb bob and chalk or ink line marker are frequently susceptible to leakage or spillage of the ink or chalk substance used to coat the marker line, are not capable of maintaining consistency in the amount of ink or chalk that will coat the line, or do not ensure application of an even film on the line surface. These deficiencies make the prior art messy, difficult to repair, and inclined to mark with uneven or broken lines.

Furthermore, combination plumb bob and chalk or ink line marker assemblies previously contemplated generally involve a line marker that is suited for use only in association with the location of verticals by a plumb bob and not for marking lines in a variety of contexts.

Finally, most of the prior art are not self-contained and involve dangling parts which are susceptible to damage, making transportation and use cumbersome and iinefficient.

SUMMARY OF THE INVENTION

In view of the foregoing disadvantages inherent in the known types of combination plumb bob and ink or chalk line markers now present in the prior art, the subject invention provides a combination plumb bob and ink line marker where the same discloses a compact, self-contained design suitable for use in a variety of contexts, an ink reservoir and application system which is segregated from other parts of the apparatus, less susceptible to ink leakage or spillage and designed to ensure the consistent application of ink to the marker line, and an automatic line braking and retracting mechanism capable of adjustment.

The present invention is simple in design and composed of common, inexpensive materials; it is, itherefore, conducfve to a low cost of manufacture and sale to the consuming public. The subject plumb bob and ink line marker device is also designed such that parts are easily and inexpensively repaired or replaced for longer and more economical use.

The present invention is compact in size and, in its storage position, has no loose or dangling parts susceptible to damage. The disclosed invention is further designed to be of durable and reliable construction.

As such, the general purpose of the present invention, which will be described subsequently in greater detail, is to provide a new and improved combination plumb bob and ink line marker apparatus which has all the advantages of the prior art and none of the disadvantages.

To attain this the present invention provides a combination plumb bob and ink line marker assembly comprising a durable, hollow case or housing having a substantially cylindrical neck portion which is threadedly and separably engaged at one end to the external circumferential edge of a substantially flat and round disc portion having a tapered point on the external circumferential edge opposite the cylindrical neck. The body of the invention, comprising the hollow casing and its contents to be described, serves as the plumb bob weight with the tapered point on the disc portion of the housing to be used for indicating the vertical.

A reel device is mounted inside the round disc portion of the housing and a length of nylon line or other sufficiently flexible and strong member is connected at one end and wound about the aforementioned reel device. One side of the reel device is engaged by gears or teeth with a spring-loaded line tension, braking, and retracting mechanism. From the reel device, the flexible member passes through an ink reservoir and application device located inside the cylindrical neck portion of the housing and segregated from other parts of the invention by cnnical apertured partitions which are designed to prevent the leakage or spillage of ink.

The flexible member exits the housing of the apparatus through an aperture in the end of the cylindrical neck portion of the housing oppositei the round disc portion of the housing. The open end of the cylindrical neck portion of the housing, through which the flexible member exits the invention, possesses a series of uniformly spaced notches and grooves around the circumferential edge for holding and guiding the line.

The other end of the flexible member is attached to a replaceable, pin-tipped tacking device after the flexible member exits the cylindrical neck portion of the housing for fastening the subject invention to a sufficiently pliable upper reference point surface when the invention is used to indicate verticals.

For storaae purposes, the tacking device is designed so as to fit securely, pin-first into the exit aperture of the cylindrical neck portion of the housing.

My invention resides not in any one of these features, per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter which will form the subject matter ofthe claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent. and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

OBJECTS AND ADVANTAGES

It is therefore an object of the present invention to provide a new and improved combination plumb bob and ink line marker apparatus which had all the advantages of the prior art and none of the disadvantages.

It is also an object of the present invention to provide a new and improved combination plumb bob and ink line marker apparatus which features automatic line braking and retraction capability, without excessive wear on associated parts.

It is another object of the present invention to provide a new and improved combination plumb bob and ink line marker apparatus which is less susceptible than the prior art of ink eakage or spillage.

It is another object of the present invention to provide a new and improved combination plumb bob and ink line marker apparatus which is capable of maintaining consistency in the amount of ink that will coat the line, and ensures application of an even film of ink on the line surface.

It is still another object of the present invention to provide a new and improved combination plumb bob and ink line marker apparatus which is conducive to marking lines in a variety of contexts.

It is another object of the present invention to provide a new and improved combination plumb bob and ink line marker apparatus which may be easily and efficiently manufactured and marketed.

A still further object of the present invention is to provide a new and improved combination plumb bob and ink line marker apparatus of durable and reliable construction, with component parts susceptible to sample and economical repair or replacement.

Yet a further object of the present invention is to provide a new and improved combination plumb bob and ink line marker apparatus susceptible of a low cosit of manufacture with regard to both materials and labor, and which accordingly is susceptible of a low price of sale to the consuming public, thereby making such plumb bob apparatus economically available to the buying public.

One further object of the present invention is to provide a new and improved plumb bob apparatus that is compact in size and, in its storage position, is free of loosely hanging parts susceptible to damage.

There, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Other objects and advantages of the present invention will become more readily apparent after considering the following drawings and description.

REFERENCE NUMERALS IN DRAWINGS

| | |
|---|---|
| 2 | Housing: cylindrical neck |
| 2a | Threads in housing neck |
| 4 | Housing connection sleeve |
| 4a | Threads in sleeve |
| 6 | Housing: disc portion |
| 6a | Cylindrical protrusion |
| 6b | Threads on protrusion |
| 8 | Housing: tapered point |
| 10 | Flexible member ("line") |
| 12 | Line reel |
| 12a | Reel: interlocking gears |
| 12b | Reel: external hub |
| 12c | Depressions in external hub |
| 14 | Reel stop |
| 16 | Spring |
| 18 | Spring spool |
| 18a | Spool: interlocking gears |
| 18b | Wheel with cogs |
| 18c | Spring tension adjustment dial |
| 18d | Spring spool stop |
| 20 | Ink reservoir: lower partition |
| 20a | Partition aperture |
| 22 | Absorbent member |
| 24 | Ink reservoir access door |
| 24a | Door closure band |
| 26 | Ink reservoir: upper partition |
| 26a | Partition aperture |
| 28 | Notches |
| 28a | Grooves |
| 30 | Pin-tipped tacking device |

DESCRIPTION OF THE DRAWINGS

The various objects, advantages, and novel features of the invention will be more readily understood from the following detailed description, in which like reference characters refer to like parts, and in which:

FIG. 5 is a top view of the line reel, spring spool, and interlocking gears or teeth.

DETAILED DESCRIPTION OF PREFERRED EMBODIMENT

Figure 1:
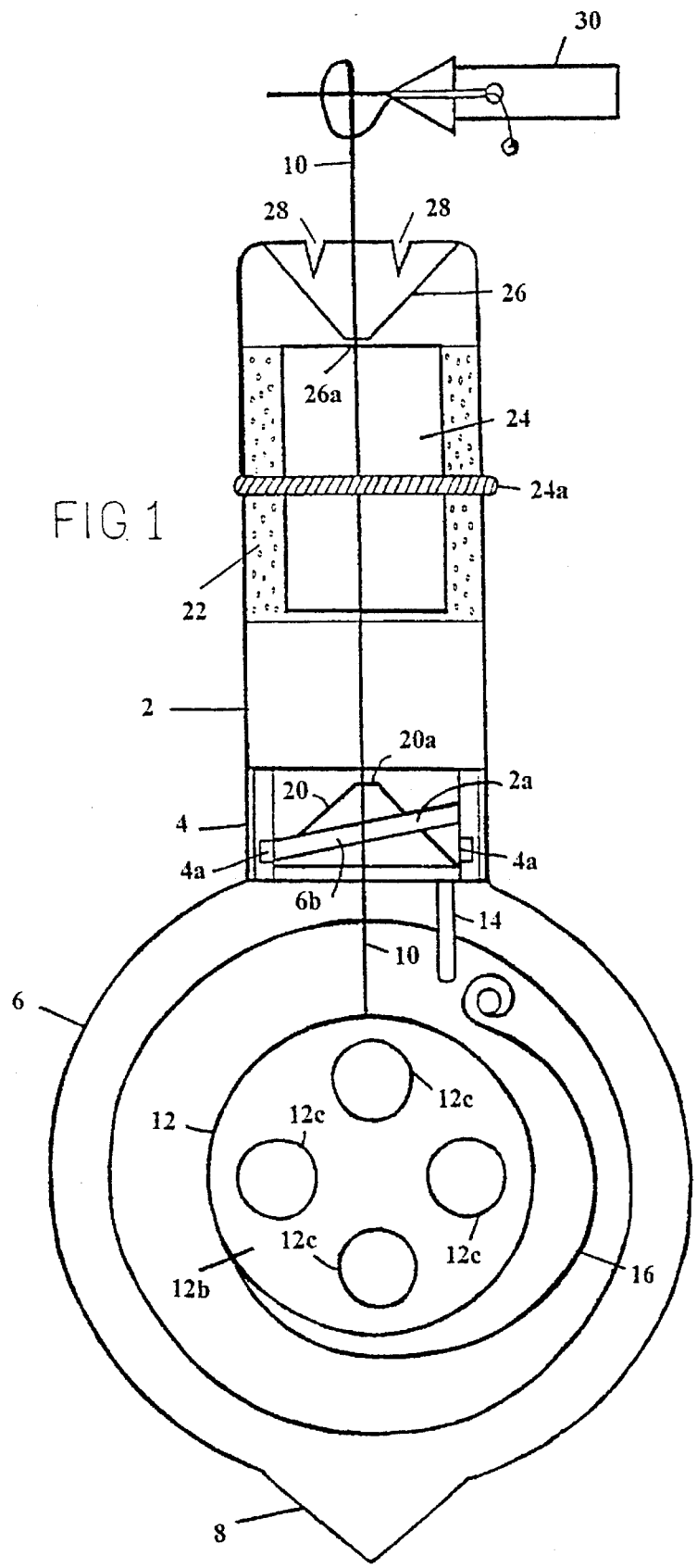
FIG. 1 is a cross-sectional side view of the preferred embodiment of the invention from a perspective facing the external hub of the line reel.

Embodiment of FIG. 1:

The apparatus housing comprises three substantially hollow parts: a cylindrical neck portion 2, a disc shaped portion 6 and a connection sleeve 4 having threads 4a to removably join the cylindrical 2 and disc shaped 6 portions of the housing by engaging the sleeve threads 4a with threads on the neck 2a and the disc shaped 6b portions of the apparatus housing.

One end of the cylindrical portion of the housing 2 is threadedly engaged with the housing connection sleeve 4. A hollow cylindrical protrusion 6a having threads 6b on the external surface thereof extends from the circumferential edge of the disc shaped portion of the housing 6 and is threadedly engaged with the connection sleeve 4 opposite the cylindrical neck 2, giving the housing of the subject invention, when all parts are connected, a pendulum-like shape.

A tapered point 8 extends from the external circumferential edge of the disc shaped portion of the housing 6, opposite the cylindrical neck 2.

A reel stop 14 extends from the threaded end 2a of the cylindrical portion of the housing 2 and into the hollow of the disc shaped portion of the housing 6, resting in close proximity to a line reel 12 device.

The line reel 12 device mounted inside the disc shaped portion of the housing 6 and a length of nylon line or other strong and flexible member (hereinafter alternatively referred to as "line") 10 is connected at one end and wound about the aforementioned reel 12 device.

Figure 2:
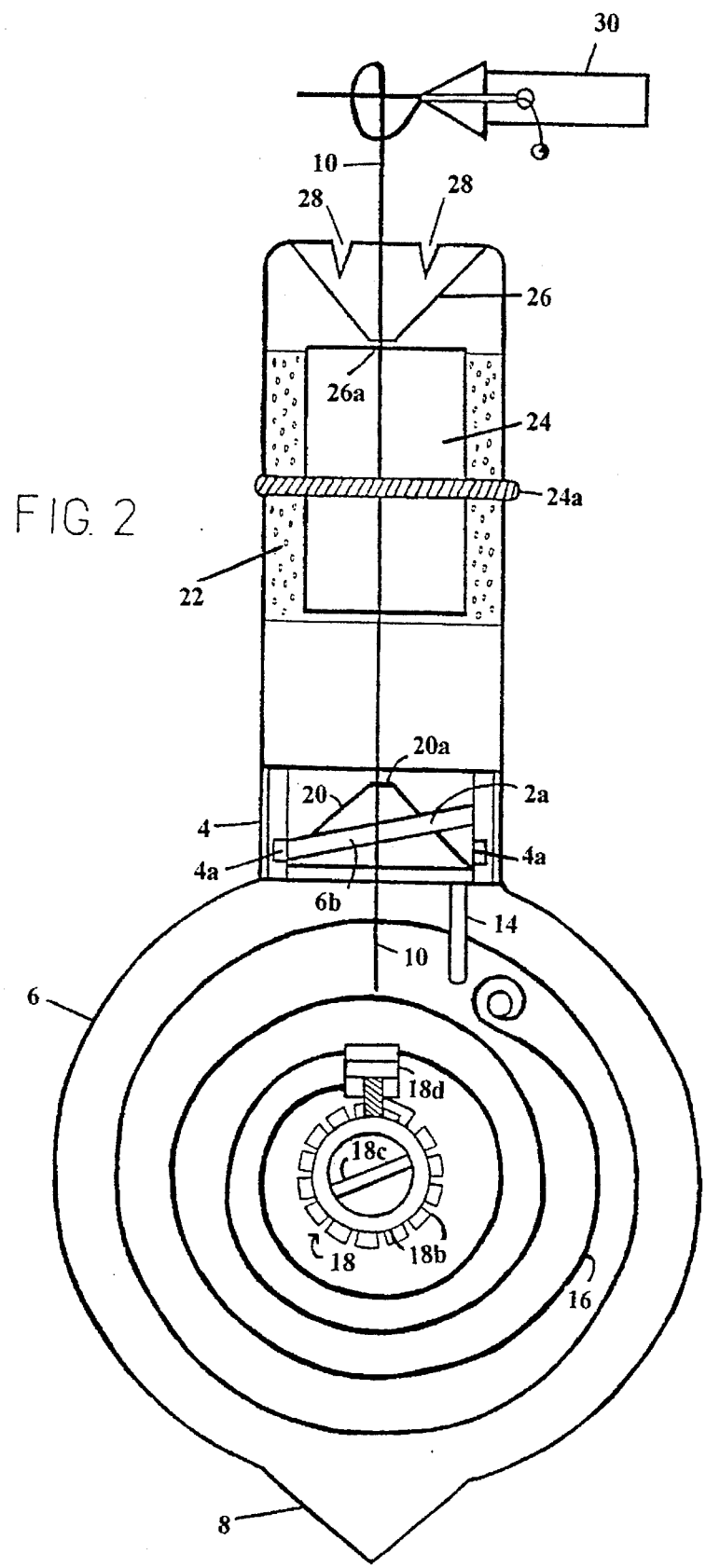
FIG. 2 is a cross-sectional side view of the preferred embodiment of the invention from a perspective facing the external spring tension adjustment dial and stop lever of the spring spool.

The end of a coiled band spring 16 attached to the internal surface of the disc shaped portion of the housing 6 is shown in FIG. 1 and is more fully disclosed in FIG. 2.

One side surface of the reel 12 device extends through an aperture in a flat side of the disc shaped portion of the housing 6 to form an external hub 12b for manual rotation of the line reel 12. Depressions 12c in the external surface of the reel hub 12b facilitate manual rotation of the reel 12.

The flexible member or line 10 extends from the line reel 12 up through an aperture 20a at the apex of a conical partition (the "lower partition") 20 and into an ink reservoir formed inside the cylindrical neck portion of the housing 2. The conical shape of the partition 20 and small aperture 20a size inhibit the leakage or spillage of ink from the reservoir.

Inside the ink reservoir, the line 10 passes over an absorbent member 22 which holds and applies ink to the line 10 as the line 10 is drawn through the apparatus. The absorbent member 22 is designed to evenly apply a consistent amount of ink to the line 10 surface, and to avoid ink lines containing ink blotches from the over-application of ink to the flexible member 10 and broken lines resulting from application of an insufficient amount ink to the flexible member 10 surface. The absorbent member 22 in effect, wipes the flexible member with ink as the flexible member is drawn over the absorbent member 22 to better ensure that the proper amount of ink and a uniform amount of ink is applied to the surface of the flexible member 10 every time.

The ink reservoir and absorbent member 22 can be accessed through a door 24 in the cylindrical neck portion of the housing 2. In the preferred embodiment, the access door 24 is held in place by a strong flexible band 24a.

The ink-coated line 10 exits the subject invention through an aperture 26a at the apex of an inverted conical partition (the "upper partition") 26 near the open end of the cylindrical portion of the housing 2.

The end of the cylindrical neck 2 through which the line 10 exits the apparatus possesses a series of notches 28 and grooves 28a for directing and holding the line 10.

The other end of the flexible member 10 is attached to a tacking device 30 for attaching the apparatus to a reference point.

Embodiment of FIG. 2:

FIG. 2 depicts the reverse side of the invention illustrated in FIG. 1. The apparatus housing as depicted in FIG. 2 is the same as that shown and described in FIG. 1.

The side surface of the line reel 12 device opposite the external hub 12b possesses gearsor teeth 12a (not shown) capable of interlocking with similar gears 18a (not shown) on an adjacent spool 18 device also located inside the disc shaped portion of the housing 6. A coiled band spring 16 is attached at one end to said spool 18 device and at the other end to the internal surface of the disc shaped portion of the housing 6.

A protrusion from the side surface of the spring spool 18 located opposite of the line reel device 12 extends through an aperture in the flat side of the disc shaped portion of the housing 6 to form an external spring tension adjustment dial 18c.

A wheel with cogs 18b is attached to the aforementioned protrusion from the spring spool 18 such that the cog wheel 18b turns simultaneously with tihe spring spool 18 and is located between the spring spool 18 and back of the spring tension adjustment dial 18c inside the disc shaped portion of the housing 6.

A spring, spool stop 18d rests in close proximity to the cog wheel 18b and extends through an aperture in the flat side of the disc shaped portion of the housing 6, opposite the external reel hub 12b, such that the spring spool stop 18d can be activated from the external surface of the invention, in a location adjacent to the external spring tension adjustment dial 18c. When activated, the spring spool stop 18d lodges between cogs on the cog wheel 18b, thereby preventing rotation of the spring spool 18.

The remainder of the drawing, showing the internal structure of the cylindrical neck portion of the housing 2, is the same as that disclosed by FIG 1.

Figure 3:
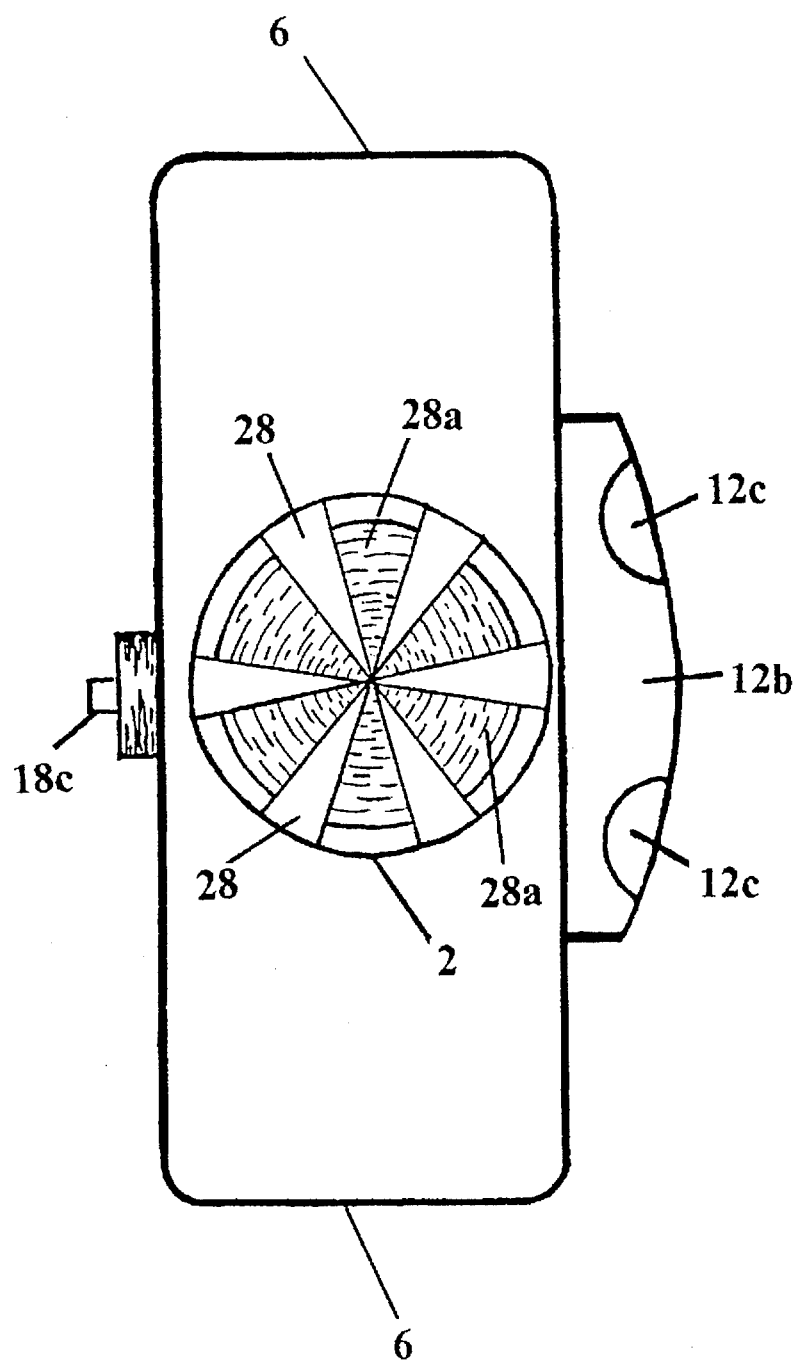
FIG. 3 is a top view of the preferred embodiment of the invention.

Embodiment of FIG. 3:

FIG. 3 discloses a top view of the preferred embodiment, showing the notches 28 and grooves 28a in the open end of the cylindrical portion of the apparatus housing 2; a top view of the inverted conical ink reservoir partition ("upper partition") 26 and the aperture 26a through which the flexible member 10 exits the apparatus, the external reel hub 12b with depressions 12c, and the external spring tension adjustment dial 18c.

Figure 4:
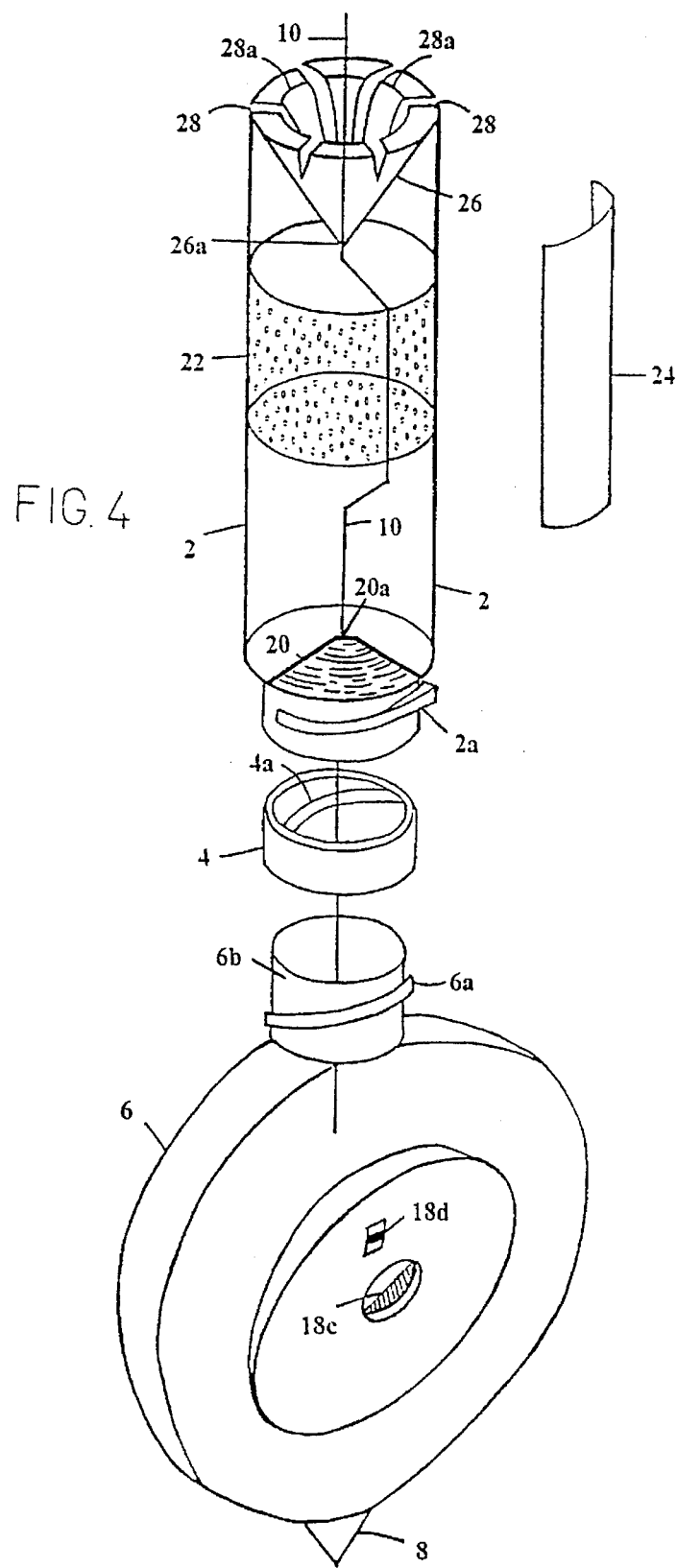
FIG. 4 is a perspective drawing of the preferred embodiment showing an exploded depiction of the cylindrical portion of the housing, connector sleeve, and disc portion of the housing.

Embodiment of FIG. 4:

FIG. 4 is a drawing of the preferred embodiment, depicting an exploded view of the cylindrical portion of the housing 2, connector sleeve 4, and disc shaped portion of the housing 6 from perspective facing the external spring tension adjustment dial 18c and spring spool stop 18d in order to better illustrate the manner in which the these parts are related.

Embodiment of FIG. 5:

FIG. 5 is a top view of the preferred embodiment illustrating the manner in which the spring spool 18 is engaged with the line reel 12 inside the disc shaped portion of the housing 6. Gears or teeth 18a on the side surface of the spring spool 18 opposite the spring tension adjustment dial 18c interlock with similar gears or teeth 12a on the side surface of the line reel 12 opposite the external reel hub 12b. The interlocking gears or teeth on both the spring spool 18a and the line reel 12a are designed so that the spool 18 and reel 12 turn simultaneously together in normal operation but can be rotated for adjustment independently of the other when one device is held constant or prevented from rotating and the other is forced to turn manually.

FIG. 5 also depicts a top view of the external reel hub 12b with depressions 12c and the protrusion from one side of the spring spool 18 which extends through an aperture in the flat side of the disc shaped portion of the housing 6, opposite the external reel hub 12b, to form the external spring tension adjustment dial 18c.

The wheel with cogs 18b is also illustrated in its position on the spool protrusion between the spring spool 18 and the back of the external spring tension adjustment dial 18c.

OPERATION

There are at least three forms of operation in which the subject invention may be engaged: (1) operation of the invention when used as a plumb bob; (2) operation of the invention when used for marking lines; and (3) adjusting the invention.

Operation of the Invention When Used as a Plumb Bob:

In actual use as a plumb bob, the apparatus is mounted by way of the tacking device 70 to an upper reference point. The body of the invention is manually pulled downward from the tacking device 30 toward a lower reference point, thereby unwinding a length of the flexible member 10 from its storage position on the line reel 12.

The body of the invention, comprising the hollow casing and its contents as described, serves as the plumb bob weight. After securing the length of the extended line 10 by one of the methods to be described so that the line 10 will not pay-out or retract, the operator waits for the suspended body of the apparatus to oscillate to a stop and then makes use of the vertical indicated by tapered pointer 8 at the base of the housing body.

Methods of Securing the Extended Flexible Member at a Given Length:

In order to define the methods by which the extended flexible member can be secured at a given length, the operation of related parts must first be clarified.

As the flexible member 10 is drawn from the body of the invention and unwound from the line reel 12, the line reel 12 is caused to rotate. By virtue of the gears or teeth on the side surface of the line reel 12a which are interlocked with similar gears or teeth on the side surface of the spring spool 18a, the spring spool 18 rotates simultaneously with the line reel 12, thereby causing the attached band spring 16 to coil.

Once the flexible member 10 is extended from the line reel 12, the coiled spring 16 can be adjusted by the spring tension adjustment dial 18c to either: (a) cause the flexible member 10 to immediately wind back onto the line reel 12 and retract into the body of the apparatus iiunder the force of the coiled band spring 16 such that the line 10 comes to rest in its original storage position on the line reel 12; or (b) cause the flexible member 10 to remain extended at the length desired, without an automatic retraction of the line 10, due to equilibrium established between the welght of the body of the subject invention and the force of the coiled spring 16 through adjustment of the spring tension adjustment dial 18c.

Therefore, in light of the operational features described, when using the subject invention as a plumb bob, after extension of the flexible member 10, in order to brake the line 10 at a desired length the operator may either: (a) depress the external spring spool stop 18d such that the stop 18d engages with the cog wheel 18b thus preventing the spring spool 18 and line reel 12 from rotating and allowing the line 10 to retract under the force of the coiled spring 16; or (b) simply release the equilibrialized line 10 at the desired length after making the necessary adjustments with the spring tension adjustment dial 18c so that the force of the coiled spring 16 will not overcome the weight of the body of the invention.

In order to effect retraction of the flexible member 10 onto the line reel 12 after use, the operator may either: (a) release the spring stop 18d, thereby allowing the force of the coiled band spring 16 to effect retracts on of the line 10 back onto the line reel 12; or (b) cradle the body of the subject invention in his hand while lifting the apparatus toward the tacking device 30. In doing so, the operator upsets the state of equilibrium between the coiled band spring 16 and the weight of the body of the invention, thereby allowing the coiled band spring 16 to effect retraction of the flexible member 10 back onto the line reel 12 and into the apparatus housing.

In the alternative, retraction of the flexible member 10 may be effected by increasung the force of the spring 16, by turning the spring tension adjustment dial 18c, so that the force of the coiled spring 16 overcomes the weight of the apparatus body. In this manner, the state of equilibrium between the coiled band spring 16 and weight of the body of the invention is similarly upset, allowing the spring 10 to effect retraction of the flexible member 10 back onto the line reel 12 and into the housing.

Operation of the Invention When Used for Marking Lines:

The present invention can be used to create clean, thin ink lines by way of a four-step process: First, the tacking device 30 is secured at a location indicating the starting point of the desired line. Second, the ink-coated flexible member 10 is manually extended from the body of the apparatus by pulling the body of the apparatus away from the tacking device 30, toward the location of the end point of the desired line. Third, the flexible member 10 is locked at the desired length by either: (a) activating the sipring spool stop 18d on the external surface of the disc shaped portion 6 of the apparatus housing, thereby interlocking the spool stop 18d with the cog wheel 18b and preventing rotation of the spring spool 18 and attached line reel 12; or (b) engaging the line reel stop 14, incated on the threaded end of the cylindrical neck 2 of the apparatus housing, with the line reel 12 by twisting the cylindrical neck 2 and disc shaped 6 portions of the housing in opposite directions so as to tighten the threaded segments of the cylindrical neck 2, connector sleeve 4 and disc shaped 16 portions of the housing. In so doing, the reel stop 14 is lowered inside the hollow of the disc shaped portion of the housing 6 until the reel stop 14 contacts the line reel 12 and prevents the line reel 12 from rotating and allowing additional line 10 to pay-out.

Finally, a line is produced between the location where the tacking device 30 is secured and the location of the open end of the cylindrical neck 2 of the apparatus housing when the ink-coated flexible member 10 is held taught, manually pulled up and away from the surface to be marked and quickly released such that the flexible member 10 snaps in a downward direction to contact and leave an ink line on the adjacent surface.

The flexible member 10 is made taught between the tacking device 30 and open end of the cylindrical neck 2 by angling the flexible member 10 against the grooves 28 and notches 28a in and around the circumferential edge of the open end of the cylindrical neck 2 portion of the apparatus housing.

Adjustment of the Invention:

A spring tension adjustment dial 18c is located on the external surface of the disc shaped portion of the invention housing 6 for purposes of increasing or decreasing the level of tension or amount of force that the coiled spring 16 possesses.

The spring 16 tension is adjusted by way of a two-step process. First, the reel stop 14 is activated as described subsequently to prevent the line reel 12 from rotating when the spring tension adjustment dial 18c is turned. Next, the spring tension adjustment dial 18c is turned so as to rotate the spring spool 18 and either coil the band spring 16 more tightly or to loosen the spring 16 coils around the spring spool 18.

As described previously herein, the spring spool 18 and line reel 12 are designed to rotate simultaneously together by virtue of interlocking gears or teeth 12a and 18a; however, because the reel stop 14 is engaged the interlocking gears or teeth 12a and 18a can be overridden and the spring tension adjustment dial 18c can be used to rotate the spring spool 18, altering the tension the spring 16, independently of the line reel 12.

The line reel stop 14 is located on the threaded end of the cylindrical neck 2 of the apparatus housing, and when not in use, rests inside the hollow of the disc shaped portion of the apparatus housing 6 in close proximity to the line reel 12.

The reel stop 14 is engaged by twisting the cylindrical neck and disc shaped 6 portions of the housing in opposite directions so as to tighten the threaded segments of the cylindrical neck 2, connector sleeve 4 and disc shaped 6 portions the housing until the reel stop 14 contacts the line reel 12 and prevents the line reel 12 from rotating and allowing additional line to to pay-out or retract.

CONCLUSION

I claim:

1. An assembly for a self contained, combination plumb bob and ink line marker capable of braking and retraction comprising:

a hollow housing, comprising a threadedly and separably engaged cylindrical neck portion, a substantially flat and round disc shaped portion with a tapered point on the circumferential edge, and a connector sleeve joining one open end of the cylindrical neck portion with the circumferential edge of the disc portion opposite the tapered point on the disc shaped portion of the housing giving the assembled invention a pendulum shape;

a line reel mounted inside the disc portion of the housing;

a strong flexible member attached at one end and wound about the line reel, extending through the cylindrical neck portion of the invention housing, to which the disc portion of the housing is attached, and out the open end of the cylindrical neck portion of the housing opposite the disc shaped portion of the housing;

an ink reservoir formed by two apertured partitions in the cylindrical neck portion of the invention housing;

absorbent member inside the ink reservoir for storing and applying ink to the flexible member as it passes over the absorbent member;

an access door in the external surface of the cylindrical portion of the invention housing allowing access to the ink reservoir and absorbent member for replenishing the ink and means for securing the door in a closed position;

a reel stop and means for halting rotation of the line reel and extension or retraction of the attached flexible member;

a hub extending from one side surface of the line reel through an aperture in the disc shaped portion of the apparatus housing for effecting manual rotation of the line reel;

a series of gears or teeth on the side surface of the line reel opposite the external reel hub;

a spring spool associated with the line reel by gears or teeth on one side surface of the spring spool which interlock with the gears or teeth on the side surface of the line reel allowing the line reel and spring spool to rotate together simultaneously and means for turning the spring spool independently of the line reel;

a coiled band spring attached at one end to the spring spool and at the other end to the internal surface of the disc portion of the apparatus and means for adjusting the tension of the spring.

2. The invention as described in claim 1 and in addition, a series of notches and grooves in and around the circumferential edge of the open end of the cylindrical neck portion of the invention housing through which the flexible member exits the body of the invention and means for holding the flexible member taught.

3. The invention as described in claim 1 and in addition, an inkreservoir in the cylindrical neck portion of the invention housing formed by apertured partitions that are substantially conical in shape and such that the apex of each conical partition is directed inwardly toward the absorbent member inside the ink reservoir space and such that the aperture in each conical partition is at the apex.

4. The invention as described in claim 1 and in addition, a tacking device at the end of the flexible member opposite the end attached to the line reel and means for attaching the flexible member to a surface.

\* \* \* \* \*